United States Patent [19]
Dulat

[11] 3,715,228
[45] Feb. 6, 1973

[54] METHOD FOR TREATING SURFACES OF BUILDING MATERIALS

[75] Inventor: Joseph Dulat, Syrena, England

[73] Assignee: United States Borax & Chemical Corporation, Los Angeles, Calif.

[22] Filed: Jan. 25, 1971

[21] Appl. No.: 109,682

[52] U.S. Cl............117/46 FC, 117/21, 117/123 A, 117/123 B, 117/123 C, 117/125
[51] Int. Cl. .................................................B44d 1/44
[58] Field of Search...117/123 A, 123 B, 123 C, 125, 117/46 FC

[56] References Cited

UNITED STATES PATENTS

| | | | |
|---|---|---|---|
| 468,321 | 2/1892 | Anderson | 117/125 X |
| 2,663,658 | 12/1953 | Scharecht | 117/125 X |
| 2,741,565 | 4/1956 | Halversen et al. | 117/125 X |
| 2,741,008 | 4/1956 | Snoddy | 117/125 X |
| 3,144,344 | 8/1964 | Unhoefer | 117/125 X |
| 2,634,219 | 4/1953 | Smith | 117/125 |
| 2,562,477 | 7/1951 | Ramsay | 117/125 X |
| 1,959,149 | 5/1934 | Baggs et al. | 117/125 |
| 3,402,060 | 9/1968 | Groskaafmanis | 117/125 X |
| 2,587,152 | 2/1952 | Harlan et al. | 117/125 X |
| 2,832,695 | 4/1958 | Compton et al. | 117/125 X |

*Primary Examiner*—William D. Martin
*Assistant Examiner*—M. R. Lusignan
*Attorney*—James R. Thornton

[57] ABSTRACT

Building materials are treated with a flux and then heated with a high temperature flame in order to provide a decorative, durable glazed surface. Especially useful for inexpensive building materials such as low density bricks made from slag or other waste materials.

6 Claims, No Drawings

METHOD FOR TREATING SURFACES OF BUILDING MATERIALS

This invention relates to an improved method for the treatment of building materials by heating with a flame in order to provide a decorative and more durable surface.

It is known that by applying heat in the form of a flame to the surface of building materials it is possible to produce a decorative surface. Examples of materials which may be treated in this way include concrete (both high density and aerated), bricks, tiles, and other similar substances, such as cement-lime-sand compositions. Concrete is generally based on Portland Cement which contains calcium silicate and/or calcium aluminate. The application of a flame to the surface of such materials for about 30 second produces, however, a poor quality glaze which is usually marred by specks of white efflorescence.

The present invention provides an improved process whereby a better glaze is produced, the time of heating required to produce the glaze is reduced, and the natural color of the material is improved or modified. Also, unlike conventional glazing procedures, the method of this invention is applicable to construction materials in situ, that is, to the walls of an existing building. It is especially useful for producing a decorative, durable glazed surface on low density bricks made from slag or other waste materials.

The present method comprises treating the surface of the building material, prior to heating, with a fluxing material. The treated surface is then heated with a flame, preferably at a temperature of at least about 1,500° C. By the application of a fluxing material it is possible to reduce the time of heating by up to about 30%.

Preferred fluxing materials are the inorganic and organic borates such as the alkali and alkaline earth metal borates, boric acid, the borate esters and glycol-borate condensation products sold under the same of LIQUIBOR. However, other well-known fluxing agents can also be used such as silica, Cornish Stone, Nepheline syenite, felspar, pegmatite, and the phosphates and silicates of the alkali and alkaline earth metals.

The fluxing material can be applied in the form of a powder or as a solution or a suspension in a liquid carrier such as water or kerosene. It is applied either directly to the untreated surface of a building material or may be applied to the surface of such material which has previously been treated with an adhesive substance.

Other materials can also be applied to the surface of the material prior to flame treatment or included in the fluxing mixture, such as metal oxides, metal borates, boron-containing frits, or other compounds which will yield a metal oxide under the conditions of the process, thereby modifying the color or surface properties of the treated building material. The metal oxides will impart a different color to the glazed product which is readily adjusted by choice of the particular metal oxide employed. For example, cobalt oxide will produce a blue coloration. The following examples illustrate the method of the present invention.

EXAMPLE

Four 2-inch cubes of concrete were treated according to the present invention by applying the appropriate additive and heating the treated surface at a temperature of about 1,500° C. with an oxygen-coal gas torch for the periods of time shown in the following table. Only one face of each cube was treated. The additives were applied as a paste in kerosene to block numbers B, C, and D. Block number E was treated with borax powder, together with 5 percent by weight of water-glass. Block number F was treated with calcium borate (colemanite) applied as an aqueous suspension containing 5 percent by weight of water-glass. The following results were obtained:

TABLE

| Block No. | Additive | Heating Time (secs.) | Notes |
|---|---|---|---|
| A (control) | blank | 27 | (1) |
| B | Borax | 21 | (2) |
| C (control) | Cobalt Oxide only | 30 | (3) |
| D | Borax and Cobalt Oxide | 23 | (4) |
| E | Borax | 22 | |
| F | Colemanite | 20 | |

Notes:

(1) Greenish surface, mediocre glazing marred with specks of white efflorescence.
(2) Greenish surface, good glazing.
(3) Blue surface, mediocre glazing marred with specks of white efflorescence.
(4) Blue surface, good glazing.

Various changes and modifications of the invention can be made and, to the extent that such variations incorporate the spirit of this invention, they are intended to be included within the scope of the appended claims.

What is claimed is:

1. The method for providing a decorative, durable, glazed surface on existing building materials of brick, concrete or cement-lime-sand compositions, which comprises treating the surface of said building materials with a borate fluxing material and then applying heat to the treated surface with a flame at a temperature of at least about 1,500° C. for up to about 30 seconds.

2. The method in accordance with claim 1 in which the building material is treated with said borate in combination with a metal oxide prior to heating, thereby modifying the color of the resultant glazed building material.

3. The method in accordance with claim 1 in which the treated surface of said building material is heated with an oxygen-coal gas torch.

4. The method in accordance with claim 1 in which said building material is a low density brick made from slag.

5. The method in accordance with claim 1 in which said fluxing material is borax.

6. The method in accordance with claim 1 in which said fluxing material is calcium borate.

* * * * *